Patented Feb. 25, 1947

2,416,552

UNITED STATES PATENT OFFICE 2,416,552

CONVERSION OF ALKYLOLAMIDES INTO OXAZOLINES

Emeric I. Valko, St. Johns, Quebec, Canada, assignor to The Richards Chemical Works, Incorporated, Jersey City, N. J., a corporation of New Jersey No Drawing. Application May 29, 1940, Serial No. 337,832

1 Claim. (Cl. 260—307)

My invention relates to the conversion of alkylolamides of a certain type into complex compounds which are soluble in acidulated water and which, owing to their surface activity in water, are useful as wetting, dispersing and finishing agents in the textile industry, as flotation agents in the mining industry, and which also possess remarkable germicidal properties.

One object of my invention is to convert the amide into an aminoester, by detaching the acyl group from the nitrogen and linking it to the oxygen of the hydroxyl.

Another object of the invention is to produce heterocyclic ring compounds having side chains attached to two or more of their carbon atoms and the conversion of such rings into the corresponding aminoesters and their acidulated water soluble salts.

I accomplish these and other objects, which will become apparent as the description proceeds, generally, by a process including the step of dehydrating an alkylolamide having the following general formula:

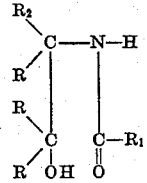

where each R is a hydrogen atom or a monovalent hydrocarbon radical which may be substituted, $R_1$ is a monovalent aliphatic or aromatic hydrocarbon radical which may be substituted and $R_2$ is an alkyl radical which may be substituted.

According to a preferred embodiment of my invention, I use as starting materials amides obtained by heating aliphatic acids with a compound having the general formula:

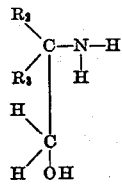

where $R_2$ is a hydroxy alkyl group and $R_3$ is a hydrogen atom, an alkyl group or hydroxyalkyl group. Compounds of this type are, for instance, tris(hydroxymethyl)aminomethane, 2-amino-2-methyl-1.3-propanediol, and 2-amino-2-ethyl-1.3-propanediol.

The amides may be dehydrated by heating them, in the absence of condensing agents, to temperatures above 200° C.

According to a specific feature of my invention, the dehydration of the amides in question may also be effected by heating the alkylolamide in the absence of condensing agents and excess acids and in the presence of an inert medium or high boiling solvent, such as for instance toluene or xylene, to the boiling temperature of the mixture and keeping it at this temperature until the amide has been converted into an oxazoline:

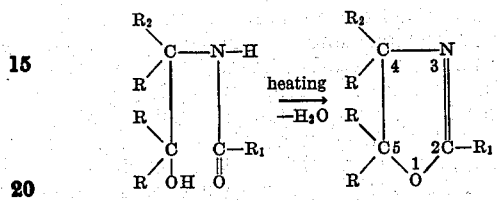

The water liberated by the reaction is removed from the reaction mixture by evaporating together with the solvent.

If tris(hydroxymethyl)amidomethanes are used as starting materials, the resulting compounds are derivatives of 4-bis(hydroxymethyl) $\Delta^2$-oxazoline, and if the amide is obtained by the condensation of tris(hydroxymethyl)aminomethane with an aliphatic acid, the dehydration product is a 2-alkyl derivative of 4-bis(hydroxymethyl)-$\Delta^2$-oxazoline.

If 2-amido-2-alkyl-1.3-propanediols are used, the resulting compounds are derivatives of 4-alkyl-4-hydroxymethyl-$\Delta^2$-oxazoline.

The oxazolines obtained may be subjected to a further heating step with alkylating agents in order to introduce further side chains.

Example I 120 gms. of tris(hydroxymethyl)aminomethane are heated in a distilling flask with 50 gms. acetic anhydride. The temperature of the liquid is raised gradually up to 230° C. Approximately 27 gms. of water distills over, indicating that the final product, a viscous liquid, is the 2-methyl 4-bis(hydroxymethyl) $\Delta^2$-oxazoline.

Example II 105 parts by weight of 2-amino-2-methyl-1.3-propanediol and 280 parts by weight of stearic acid are mixed with 150 parts by weight of xylene and the mixture is kept at boiling temperature. The overdistilled liquid separates in xylene and water and the xylene is continuously led back into the reaction mixture. During four hours about 37 parts by weight of water are collected. Thereafter the xylene is evaporated by heating under reduced pressure. The reaction may be graphically represented as follows:

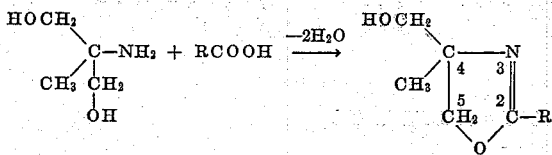

The obtained product is a white solid which can be dissolved by boiling with aqueous acetic acid. The product is the salt of the monoester

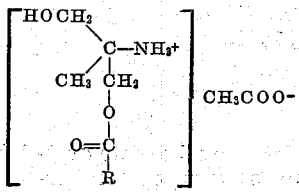

*Example III*

120 parts by weight of 2-amino-2-ethyl-1.3-propanediol and 200 parts by weight of lauric acid are mixed with 150 parts by weight of xylene. The procedure follows the description of Example II. The product obtained can be dissolved in boiling aqueous acetic acid and exhibits an excellent surface activity.

The new substances obtained in accordance with my invention can be used in solid or liquid form or as aqueous and non-aqueous solutions alone or mixed with other materials. In addition to the already mentioned uses, they can be employed with benefit in cleaning, filling, sizing, desizing, impregnating, mercerizing, delustering, degumming, stripping, felting, oiling, dyeing and printing of natural and synthetic textile materials as wool, cotton, silk, rayon, etc. They are further useful as plasticizers for natural and synthetic rubbers and resins.

I claim:

A process for producing a 2-methyl-4-bis(hydroxymethyl)-$\Delta^2$-oxazoline, comprising the step of gradually heating 120 parts by weight of tris-(hydroxymethyl) aminomethane with 50 parts by weight of acetic anhydride in the absence of condensing agents to 230° C., until approximately 27 parts by weight of water distill over.

EMERIC I. VALKO.

REFERENCES CITED

The following references are of record in the file of this patent:

UNITED STATES PATENTS

| Number | Name | Date |
|---|---|---|
| 2,181,534 | Martin | Nov. 28, 1939 |
| 2,151,788 | Mauersberger | Mar. 28, 1939 |
| 2,215,038 | Hodgins | Sept. 17, 1940 |
| 2,089,212 | Kritchevsky | Aug. 10, 1937 |
| 2,114,326 | Adams | Apr. 19, 1938 |
| 1,990,453 | Hund et al. | Feb. 5, 1935 |
| 1,805,355 | Bockmuhl et al. | May 12, 1931 |
| 2,173,058 | Kritchevsky | Sept. 12, 1939 |
| 1,934,309 | Hoover | Nov. 7, 1933 |
| 2,267,965 | Wilson | Dec. 30, 1941 |
| 2,155,877 | Waldman | Apr. 25, 1939 |
| 2,161,938 | Sonn | June 13, 1939 |

FOREIGN PATENTS

| Number | Country | Date |
|---|---|---|
| 409,345 | German | Feb. 5, 1925 |
| 144,475 | Swiss | Mar. 16, 1931 |
| 830,125 | French | May 9, 1938 |

OTHER REFERENCES

Journal American Chemical Society, June 1935, pages 1079–1080, 260–307.

Use of Solvents in Synthetic Organic Chemistry, McArdle 1925. Van Nostrand Co., New York, pp. 9, 122 to 126.